United States Patent
Haas et al.

(10) Patent No.: US 9,336,178 B2
(45) Date of Patent: May 10, 2016

(54) OPTIMIZING CONTENT AND COMMUNICATION IN MULTIACCESS MOBILE DEVICE EXHIBITING COMMUNICATION FUNCTIONALITIES RESPONSIVE OF TEMPO SPATIAL PARAMETERS

(75) Inventors: David Haas, Kochav Yair (IL); Simon Adar, Tel Aviv (IL); Elad Noor, Tel-Aviv (IL)

(73) Assignee: VELOCEE LTD., Kochav Yair (IL)

( * ) Notice: Subject to any disclaimer, the term of this patent is extended or adjusted under 35 U.S.C. 154(b) by 1445 days.

(21) Appl. No.: 12/339,276

(22) Filed: Dec. 19, 2008

(65) Prior Publication Data

US 2010/0161831 A1 Jun. 24, 2010

(51) Int. Cl.
*G06F 15/167* (2006.01)
*G06F 15/173* (2006.01)
*G06F 15/16* (2006.01)
*H04L 29/08* (2006.01)

(52) U.S. Cl.
CPC .............. *G06F 15/173* (2013.01); *H04L 67/22* (2013.01); *H04L 67/30* (2013.01); *H04L 67/303* (2013.01); *H04L 67/306* (2013.01); *H04L 67/2809* (2013.01); *H04L 67/2838* (2013.01)

(58) Field of Classification Search
CPC ........ H04L 29/08153–29/08261; H04L 12/56; H04L 12/2498; H04L 29/0818; H04L 29/08972; H04L 67/2842; H04W 28/08; G06F 15/173; H04N 21/262
USPC ............ 709/231, 224, 222; 455/456.1–456.6, 455/414.2–414.4, 452.1, 453.1, 450; 370/241, 338
See application file for complete search history.

(56) References Cited

U.S. PATENT DOCUMENTS

| 6,385,641 B1 | 5/2002 | Jiang et al. |
| 6,665,732 B1 * | 12/2003 | Garofalakis et al. .......... 709/247 |
| 6,742,033 B1 | 5/2004 | Smith et al. |

(Continued)

OTHER PUBLICATIONS

Pahalawatta, Peshala, "Content-Aware Resource Allocation and packet scheduling for video transmission over wireless network", IEEE Journal on Selected Areas in communication vol. 25, No. 4 May 2007 p. 749-759.*

(Continued)

*Primary Examiner* — Aftab N. Khan
(74) *Attorney, Agent, or Firm* — Finnegan, Henderson, Farabow, Garrett & Dunner, LLP (57) ABSTRACT

A content and traffic managing system operatively associated with and a computer implemented method of managing traffic of a mobile device exhibiting communication functionality. The mobile device is connectable to users and to content providers via communication links. The system tracks various parameters over time, and schedules communication, both in relation to predefined or projected content responsive of the following: users' content related behavior, users' communication behavior, users' external behavior, and parameters of communication links. The method comprises: (i) tracking users' content related behavior, communication behavior and users' external behavior over time; (ii) tracking parameters of communication links over time; (iii) scheduling and initiating communication related to predefined or projected content responsive of the above mentioned criteria at time slots selected such that the communication is performed in view of users' predefined or projected preferences in accordance with the parameters of communication links.

30 Claims, 7 Drawing Sheets

(56) References Cited

U.S. PATENT DOCUMENTS

| | | | |
|---|---|---|---|
| 6,748,451 B2 * | 6/2004 | Woods et al. | 709/248 |
| 6,937,575 B1 * | 8/2005 | Galich et al. | 370/254 |
| 6,985,933 B1 | 1/2006 | Singhal et al. | |
| 7,152,018 B2 * | 12/2006 | Wicks | 702/186 |
| 7,249,313 B2 | 7/2007 | Brown et al. | |
| 7,263,368 B2 | 8/2007 | Knauerhase et al. | |
| 7,437,438 B2 * | 10/2008 | Mogul et al. | 709/223 |
| 8,364,611 B2 | 1/2013 | Tendjoukian et al. | |
| 2002/0007404 A1 * | 1/2002 | Vange et al. | 709/217 |
| 2002/0116517 A1 * | 8/2002 | Hudson et al. | 709/231 |
| 2003/0087652 A1 * | 5/2003 | Simon et al. | 455/466 |
| 2003/0108059 A1 * | 6/2003 | Yew et al. | 370/443 |
| 2003/0159150 A1 * | 8/2003 | Chernock et al. | 725/58 |
| 2004/0044762 A1 * | 3/2004 | Peacock | 709/224 |
| 2005/0286686 A1 * | 12/2005 | Krstulich | 379/32.01 |
| 2006/0023748 A1 * | 2/2006 | Chandhok et al. | 370/469 |
| 2006/0068812 A1 * | 3/2006 | Carro et al. | 455/456.3 |
| 2007/0066297 A1 * | 3/2007 | Heidari-Bateni | 455/423 |
| 2007/0179948 A1 * | 8/2007 | Jennings, III | 707/6 |
| 2007/0269787 A1 * | 11/2007 | Cronstrom | 434/350 |
| 2008/0037525 A1 * | 2/2008 | Karaoguz et al. | 370/352 |
| 2008/0037578 A1 * | 2/2008 | Carlson et al. | 370/463 |
| 2008/0051081 A1 * | 2/2008 | Nelson | 455/432.3 |
| 2008/0189425 A1 * | 8/2008 | Green | 709/227 |
| 2008/0279155 A1 * | 11/2008 | Pratt et al. | 370/336 |
| 2009/0073885 A1 * | 3/2009 | Jalil et al. | 370/241 |
| 2013/0124442 A1 | 5/2013 | Tendjoukian et al. | |
| 2013/0172043 A1 * | 7/2013 | Garg et al. | 455/524 |
| 2013/0275685 A1 | 10/2013 | Barbas et al. | |
| 2014/0095943 A1 | 4/2014 | Kohlenberg et al. | |

OTHER PUBLICATIONS

Aaron Schulman et al. "Bartendr: A Practical Approach to Energy-aware Cellular Data Scheduling".*

* cited by examiner

OPTIMIZING CONTENT AND COMMUNICATION IN MULTIACCESS MOBILE DEVICE EXHIBITING COMMUNICATION FUNCTIONALITIES RESPONSIVE OF TEMPO SPATIAL PARAMETERS

BACKGROUND

1. Technical Field

The present invention generally relates to the field of mobile devices exhibiting communication functionalities. More particularly, the present invention relates to optimizing content exchange in communication.

2. Description of Related Art

Prior to setting forth the background of the related art, it may be helpful to set forth definitions of certain terms that will be used hereinafter.

The term "communication" as used herein in this application, is defined as the process of exchanging information, specifically over a communication link. Communication may comprise downloading information, uploading information, information synchronization, data updating and the like.

The term "communication link" as used herein in this application, may comprise at least one of: a wireless communication network, a cellular communication network, a computer network, a local-area network (LAN), a metro area network (MAN), a wide area network (WAN), a personal area network (PAN), a wireless local area network (WLAN), a mobile phone network (3G, 4G etc.), a communication network utilizing any of: HSPA (High Speed Packet Access), 3GPP Long Term Evolution, USB, wireless USB, cellular GPRS (General Packet Radio Service), 1.x (relating to IEEE 802.1X standards for port-based Network Access Control); a WiFi communication network, a Bluetooth communication network, an ultra wideband communication network, an IR (infrared) communication network, a data transmission network over the telephone network (e.g. xDSL—digital subscriber line), a switch, a hub.

Today there are several ways to connect to the Internet. The predominant wired connections are DSL and Cable Modem. Dial-up is receding and fiber optics are just starting to ramp up. Prevalent wireless connections are Wi-Fi for LAN, and 3G technologies such as GPRS and HSPA for cellular networks.

The limiting factors for wired broadband are the devices and the wired infrastructure. With wireless, limitations are governed by the capacity of the shared media, and therefore have limited bandwidth for use. Wireless access always will lag behind wired connectivity in terms throughput, latency, availability, quality of service, while maintaining and advantage of mobility.

The user is served data mostly by the application "pulling" the desired information and presenting it to him as soon as it is available. In some networked systems, cache and proxy servers have been added either at the application level or as dedicated proxy servers in the near parts of the network. Caches can be preloaded with data content predicted by the given users' previous preference-behavior, although in most known cases this is not implemented.

The amount of devices which are capable of multiple types of connections has grown in the recent years, for example both WiFi and HSPA/GPRS in a mobile device. Today, users are able to connect to a free/low-cost, high bandwidth wireless connection where one is available, and to connect to an alternative costly option otherwise (there are even ways to have seamless roaming capabilities between these various connection types).

The following patents are incorporated herein by reference in their entirety: U.S. Pat. No. 7,263,368, which discloses anticipation of communication connectivity changes for mobile devices; U.S. Pat. No. 6,985,933, which discloses a method and system for increasing ease-of-use and bandwidth utilization in wireless devices; U.S. Pat. No. 6,742,033, which discloses a system, method and computer program product that pre-caches content to provide timely information to a user; U.S. Pat. No. 6,385,641, which discloses adaptive pre-fetching for computer network and web browsing with a graphic user interface; and U.S. Pat. No. 7,249,313, which discloses a method of creating and utilizing a wizard to capture an application's interdependencies between web pages and data accesses for running the application's downloadable dynamic web pages off-line.

BRIEF SUMMARY

Embodiments of the present invention provide a content and traffic managing system operatively associated with a mobile device exhibiting communication functionality. The mobile device is associated with at least one user and exhibits a plurality of connectivity capabilities with a plurality of content providers via a plurality of communication links. One traffic managing system comprises: a tracker and a scheduler. The tracker is arranged to track over time: users' content related behavior, users' communication behavior, users' external behavior, and parameters of communication links. The scheduler is arranged to initiate communication related to predefined content responsive of the users' content related behavior, users' communication behavior, users' external behavior at time slots selected such that the communication is performed in view of users' predefined or projected preferences in accordance with the parameters of communication links. In embodiments, the traffic managing system is embodied as a module in the mobile device.

In embodiments, the traffic managing system further comprises mediators connected via a communication link to the mobile device and arranged to process traffic such that the communication is performed in view of users' predefined or projected preferences in accordance with the parameters of communication links.

In embodiments, the traffic managing system further comprises a server connected to the mobile device via a communication link. The server comprises a database comprising information relating to at least part of: the users' content related behavior and communication behavior, the parameters of communication links, the predefined content, the users' external behavior, a combination thereof. In embodiments, the server further comprises at least one grouping of users that are grouped in relation to at least one of: the users' external behavior, the users' content related behavior, the users' communication behavior, the predefined content, external data related to the users.

Embodiments of the present invention further provide a computer implemented method of managing traffic of a mobile device exhibiting communication functionality. The mobile device is associated with at least one user and exhibits a plurality of wireless connectivity capabilities with a plurality of content providers via a plurality of communication links. One computer implemented method comprises: (i) tracking users' external behavior, users' content related behavior and communication behavior over time; (ii) tracking parameters of communication links over time; (iii) scheduling communication related to predefined content responsive of users' external behavior, users' content related behavior and communication behavior at time slots selected such that the communication is performed in view of users' predefined or projected preferences in accordance with the parameters of communication links; and (iv) initiating communication related to predefined content according to the scheduling.

In embodiments, the computer implemented method further comprises grouping users with logical proximity, and enabling exchanging data between users with logical proximity.

In embodiments, the computer implemented method further comprises predicting user content consumption relating to at least one of: data from at least one of: users' navigation system, users' related databases, databases of personal information management systems such as a digital calendar, user interaction with other applications.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

The drawings together with the following detailed description make apparent to those skilled in the art how the invention may be embodied in practice.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usage of the following terms in the present disclosure are defined in a non limiting manner:

The term "parameters" as used herein in this application, is broadly defined as any current, past, or projected parameters. Parameters of communication links may comprise at least one of: communication rate, energy consumption, connection costs, security of connection, communication costs, location availability, available bandwidth, latency, quality of service, mobility, stability, redundancy, overhead, technology used, temporal patterns thereof, spatial patterns thereof.

The term "content" as used herein in this application, is defined as information related to a user. "Content" may comprise by way of illustration files, multimedia elements (such as text, images, audio, streaming data such as streaming radio and streaming TV, video, a combination thereof), any form of data and any other suitable embodiments.

The term "content related behavior" as used herein in this application, is defined as user actions relating to content, such as downloading content, uploading content, sharing content, caching content, updating content, and synchronizing content.

The term "external behavior" as used herein in this application, is defined as user actions not related to content, such as changing a geographical position or a location, meeting people, registering in systems, turning devices on and off as such and in relation to times and locations, charging batteries, using mobile device applications, using applications or web based activities on other devices, and so forth. External behavior may further comprise data relating to future actions of the user, such as planned movements, planned events (e.g. from an electronic calendar), planned timings, sending or receiving messages etc.

The term "external events" as used herein in this application, is defined as any event that is unrelated to user's content related behavior nor to user's external behavior. External events may comprise by way of illustration environmental events, transportation related events, activities performed by other people, or other events and suitable embodiments that may affect the communication system.

The term "logical proximity" as used herein in this application, is defined as a connection between two or more users relating to a similarity between the users in parameters of their content related behavior, or their external behavior, or their communication behavior, or their communication parameters or a combination thereof.

Figure 1:
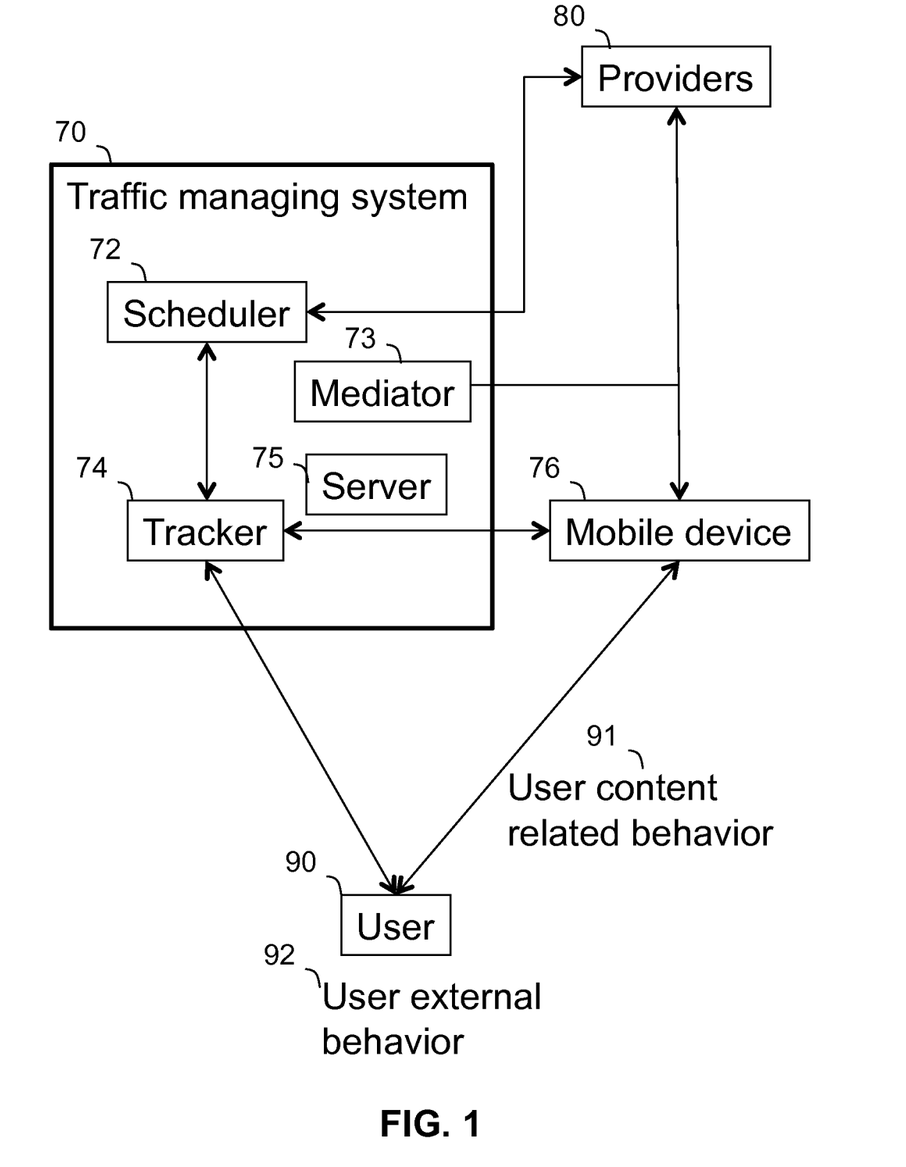
FIG. 1 is a high level block diagram illustrating a traffic managing system according to some embodiments of the invention.

FIG. 1 is a high level block diagram illustrating a traffic managing system 70 according to some embodiments of the invention. Traffic managing system 70 is operatively associated with (and may be at least partly embedded within) a mobile device 76 exhibiting communication functionality associated with at least one user 90. Mobile device 76 exhibits a plurality of connectivity capabilities with a plurality of content providers 80 via a plurality of communication links (not shown). Traffic managing system comprises a tracker 74 and a scheduler 72. Tracker 74 is arranged to track over time users' content related behavior 91, users' 90 communication behavior, users' external behavior 92, and parameters of the communication links. Scheduler 72 is arranged to initiate communication related to predefined or projected content responsive of users' content related behavior 91, users' 90 communication behavior, and users' external behavior 92 and external events at time slots selected such that the communication is performed in view of users' 90 predefined preferences in accordance with the parameters of communication links.

According to some embodiments of the invention, traffic managing system 70 is a decentralized system, parts of which may be hosted on different servers or devices. In particular tracker 74 and scheduler 72 may be embedded together or independently, each of tracker 74 and scheduler 72 may be implemented as a whole or separated to complementary parts embodied on different devices.

According to some embodiments of the invention, traffic managing system 70 may be partly or fully implement on a desktop computer, allowing user 90 to manage traffic of mobile device 76 via the desktop computer. Traffic managing system 70 may be configured to enable immediate completion of traffic upon connecting mobile device 76 to the desktop computer.

According to some embodiments of the invention, traffic managing system 70 may further comprise a server 75 comprising a database with information related to user 90, content, providers 80, the communication links etc. According to some embodiments of the invention, server 75 may pre-process content for effective presentation on or communication with mobile device 76.

According to some embodiments of the invention, server 75 may comprise a database or an analyzing module arranged to group users into groupings in relation to at least one of a user's external behavior 92, a user's content related behavior 91, a user's communication behavior, the predefined content, external data related to users 90, and external events.

According to some embodiments of the invention, server 75 may comprise a database or an analyzing module arranged to form groupings of users with logical proximity. Traffic managing system 70 may enable exchanging data between the users with logical proximity without resending the data itself from the network. The groupings may comprise pairs or larger groups.

According to some embodiments of the invention, user to user connection may be established as an ad hoc connection at any stage.

According to some embodiments of the invention, traffic managing system 70 may further comprising at least one mediator 73 connected via a communication link (not shown) to mobile device 76 and arranged to process traffic such that the communication is performed in view of users' 90 predefined preferences in accordance with the parameters of communication links. Mediator 73 may be arranged to process traffic such that the communication is performed in accordance with parameters supplied by at least one of tracker 74, scheduler 72, user 90, or server 75.

Mediator 73 may be connected between server 75 (e.g. a content server, a traffic managing server) and mobile device 76, between multiple mobile devices 76, multiple servers 75, or combinations of the above.

According to some embodiments of the invention, mediator 73 may comprise a mobile device used e.g. to distribute content to other mobile devices.

According to some embodiments of the invention, mediator 73 may assist in the transaction of data either between the web or providers 80 and mobile device 76 or between server 75 and mobile device 76 or both by adding or modifying content or control information, with or without storage, on the fly or store and forward. Mediator 73 may be connected to or embedded within any communication device such as servers, mobile devices, non mobile device as well as storage devices and their combinations. Mediator 73 may comprise or mediate among networking devices such as router, traffic controller, switch, proxy etc. Mediator 73 may mediate any of the following: a server to server, networking devices such as router, traffic controller, switch, proxy etc., other mobile devices, non mobile devices, storage devices, or combinations thereof.

According to some embodiments of the invention, mediator 73 may be a mobile device, e.g. distributing downloaded content on other mobile devices upon completing a download itself.

According to some embodiments of the invention, mediator 73 may be connected to another mediator rather than directly to mobile device 76. The connection may be intermittent, so it can mediate even when not connected, only anticipating connection. The predefined preferences can be either system preferences, user preferences, mediator(s) preferences, or a combination of some of them. The database of server 75 or part of it may be located on mobile device 76 or on mediator 73.

According to some embodiments of the invention, scheduler 72 may be arranged to initiate communication in relation to status parameters of the mobile device 76. Status parameters may comprise available bandwidth, available connection types, price of connection, battery life, available memory, content update times, CPU (central processing unit) usage, available memory (e.g. RAM—random access memory), available file-system storage, connectivity of GPS (global positioning system) or of another method for determining location, location, temporal patterns thereof, spatial pattern thereof. The status parameters can be of mobile device 76 or of mediator 73.

According to some embodiments of the invention, scheduler 72 may be arranged to initiate communication in relation to the security of connection in relation to the kind of content that is to be communicated, e.g. unsecured public Wi-Fi will not be used to exchange sensitive data.

According to some embodiments of the invention, tracker 74 is arranged to classify users in different ways, e.g. according to predefined data, logical proximity among users, users' external behavior 92, users' content related behavior 91, users' communication behavior, the predefined content, external data related to users 90, external events.

According to some embodiments of the invention, any parameter related to traffic managing system 70 can independently be configured manually or automatically at any point of the system decision. Also priorities for different parameters of the system may be independently, manually or automatically configured.

According to some embodiments of the invention, some of the elements in traffic managing system 70 may be implemented in non-mobile devices, and traffic managing system 70 may serve also non-mobile devices.

According to some embodiments of the invention, traffic managing system 70 may further comprise web sites and other network located servers and network nodes in core and access networks providing specific content can be made available that enhances the performance of traffic managing system 70. For example, these may comprise dedicated web pages or files with hints and metadata that can be used to decide on other page relevancy, network load, appropriate download speeds and times, delays, alternative routes etc.

According to some embodiments of the invention, tracker 74 may utilize the content related to user 90 to gather information relating to at least one of: users' external behavior 92, users' content related behavior 91, characteristics relating to other users, external events. Traffic managing system 70 may utilize voice recognition algorithms.

According to some embodiments of the invention, server 75 may comprise a powerful web server with significant amounts of storage space and excellent internet connection. Mobile device 76 may comprise a handheld device with at least 1-2 GB dedicated for caching, an internet connection which changes between cheap and fast to expensive and slow, and a modern browser such as WebKit (Safari/Android), Gecko (Firefox), Opera, IE7. Server 75 and mobile device 76 may be connected via internet access points such as cellular 3G/4G, WiFi, Bluetooth, ultra wideband, USB, wireless USB, xDSL. Server 75 may query all relevant URLs every X seconds, and store every version of them, along with a time-stamp and hash.

According to some embodiments of the invention, mobile device 76 may be arranged to have the following three modes: (i) a standby mode, in which mobile device 76 synchronizes its cache with server 75 according to the available connections, user behavior, website update rates, etc.; (ii) a user mode, in which content is synchronized with server 75 while using the browser and prior to displaying it; and (iii) a stealth mode, in which content is synchronized only upon explicit request from the user.

According to some embodiments of the invention, mobile device 76 may synchronize by sending identifying items (e.g. time-stamp and hash) of its cached version to server 75. Server 75 immediately queries the URL and updates it. If mobile device 76 doesn't have the latest version, server 75 runs a differential analysis between the latest version and the one cached on the mobile device 76, and sends only the difference data to mobile device 76. Mobile device 76 integrates the cached version with the difference data.

According to some embodiments of the invention, in non-stealth mode, if the browser on mobile device 76 requests a file, mobile device 76 first synchronizes it and then displays it or first displays it and then synchronize and updates the display. In stealth mode, the mobile device 76 still sends the time-stamp for the file, but server 75 (or the web service) sends back only the fields that are out-of-synchronization. The browser indicates these fields (e.g. by changing background color and an automatic or user driven event will update them (double-click, for example).

Figure 2:
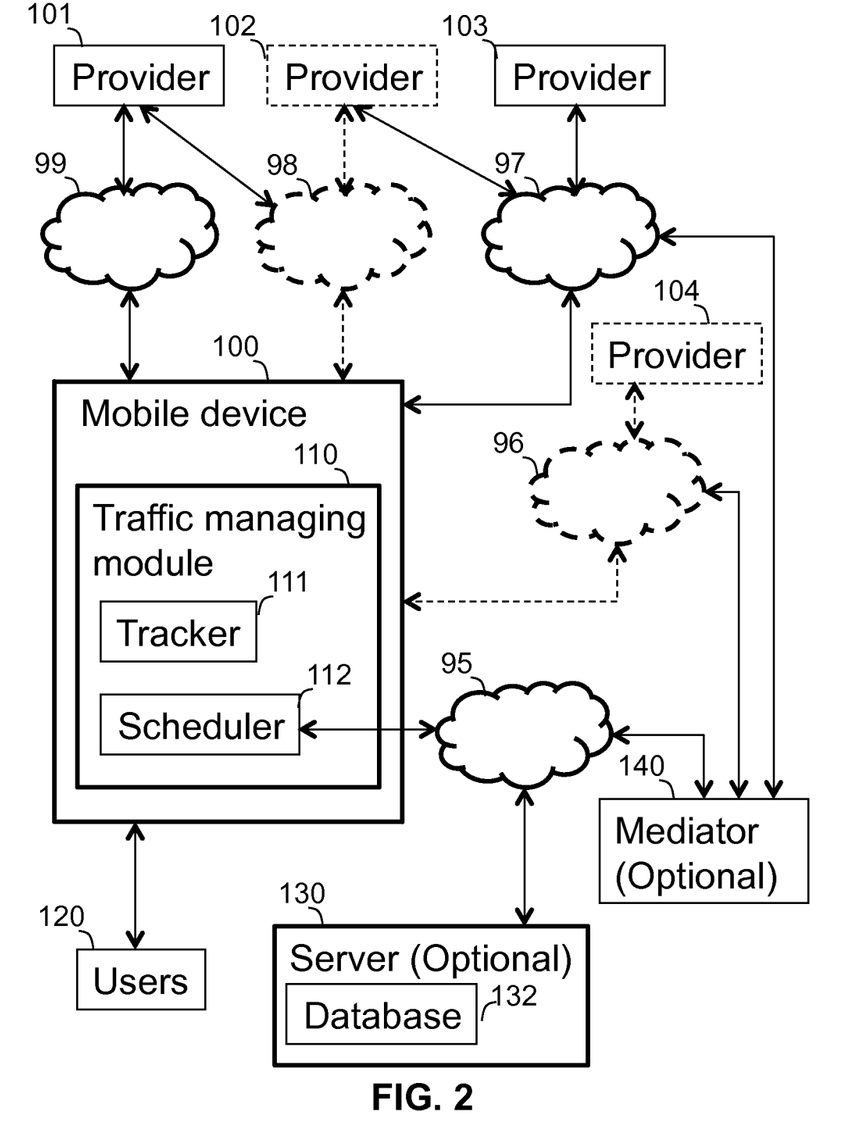
FIG. 2 is a high level block diagram of a traffic managing module according to some embodiments of the invention.

FIG. 2 is a high level block diagram of a traffic managing module 110 according to some embodiments of the invention. Traffic managing module 110 is a non limiting example of one possible embodiment of traffic managing system 70. Traffic managing module 110 is operatively associated with a mobile device 100 exhibiting communication functionality and associated with at least one user 120. Mobile device 100 exhibits a plurality of wireless connectivity capabilities with a plurality of content providers 101, 102, 103, 104 via a plurality of communication links 99, 98, 97, 96 respectively. Content providers may be connected to mobile device 100 via multiple communication links (see content providers 101, 102 each connected via two communication links). Traffic managing module 110 comprises a tracker 111 and a scheduler 112. Tracker 111 is arranged to track parameters of communication such as users' 120 content related behavior, users' 120 communication behavior, users' 120 external behavior, external events, optionally users' 120 geographical location, and the parameters of communication links 99, 98, 97, 96 over time. Scheduler 112 is arranged to initiate communication related to predefined or projected content responsive of users' 120 content related behavior, users' 120 communication behavior and users' 120 external behavior—at time slots selected such that the communication is performed in view of users' 120 predefined preferences in accordance with users' 120 geographical location and the parameters of communication links 99, 98, 97, 96.

According to some embodiments of the invention, the system may use available communication links 97, 99 and respectively available providers 103, 101 as alternative routes for delivering information for unavailable communication links 96, 98 and respectively unavailable providers 104, 102. According to some embodiments of the invention, the system may plan information transfer according to the expected or learned movement patterns of users. The movement patterns of users may be utilized to plan information transfer according to expected available communication links 97, 99 and available providers 103, 101 and relating to expected unavailable communication links 96, 98 and unavailable providers 104, 102.

According to some embodiments of the invention, the system may further comprise a server 130, connected to mobile device 100 via a communication link 95. Server 130 may comprise a database 132 comprising information related to users 120, content, providers 101, 102, 103, 104, communication links 96, 97, 98, 99. According to some embodiments of the invention, server 130 may pre-process the predefined content for effective presentation on the end device (for example, re-encoding of video that is encoded in an unsupported format like FLV (flash video)).

According to some embodiments of the invention, server 130 further comprises at least one grouping of users related to at least one of users' 120 external behavior, users' 120 content related behavior, users' 120 communication behavior, the predefined content, external data related to users 120, and external events.

According to some embodiments of the invention, scheduler 112 is further arranged to initiate communication at time slots selected such that the communication is performed in view of the at least one grouping of users 120.

According to some embodiments of the invention, the communication is carried out between at least two users 120. Scheduler 112 is arranged to initiate communication related to predefined content responsive of the external behavior, content related behavior and communication behavior of the users 120. The communication is initiated at time slots selected such that the communication is performed in view of the users' 120 predefined preferences in accordance with the parameters of communication links.

According to some embodiments of the invention, tracker 111 is further arranged to track over time data from at least one of a users' 120 navigation system, users 120 related databases, and databases of personal information management systems such as a digital calendar or other local and on line scheduling planning and tracking services.

According to some embodiments of the invention, users 120 preferences may be automatically or manually configured by at least one of: the user, a remote server, a peer, predefined instruction tables.

According to some embodiments of the invention, the predefined content may comprise mail, web portals of any kind (like news, fashion), content portals like YouTube, Music and radio, search engines, Social networks, chats, peer to peer exchanged files, streaming audio, web portal, video, adobe flash, music, games, software, scripts, streaming of any kind.

According to some embodiments of the invention, the system determines the mobile device's connection type at any specific location and time and caches the whole or part of the data to the mobile device's memory. Caching is carried out in a progressive manner whereby the download updates the existing data. The system optimizes the connection download (and the time slots) in terms of available bandwidth, availability of the connection type in the users' route, price of connection, battery life, available memory and update times of users 120 preferred content. The system takes into account the users' preferences for internet content, the users' internet usage patterns at specific times and locations, the common routes the users usually chooses and all the available different access methods and protocols available for the users' mobile device (such as: cellular 3G/4G, WiFi, Bluetooth, ultra wideband, USB, wireless USB, xDSL, IR (Infrared)) in that geographic area. The system may further take into account the available bandwidth, availability of the connection type in the users' route, price of connection, update times of users' 120 preferred content, the predicted duration of time located in the specific wireless providers' elements along the route.

Figure 3:
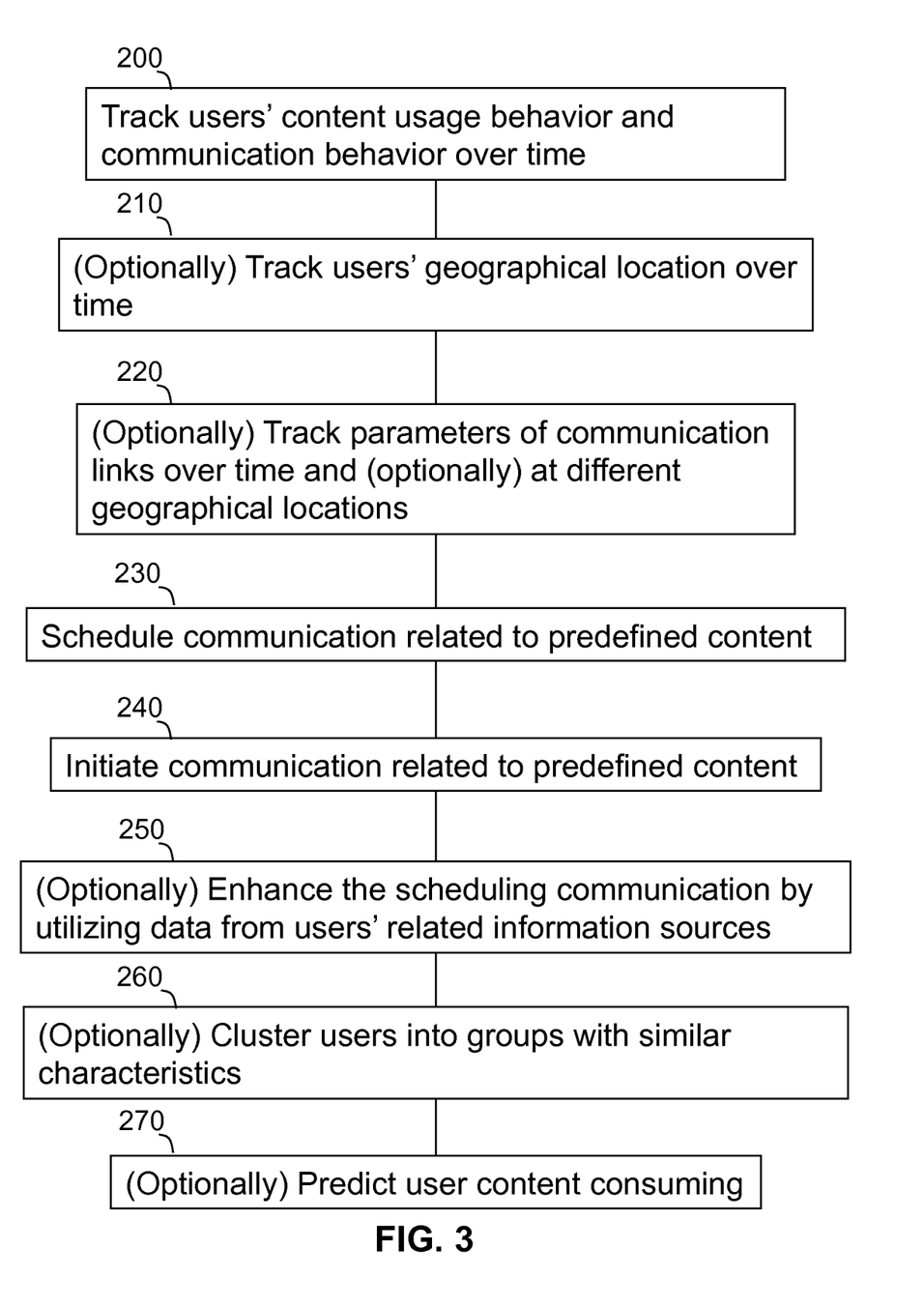
FIG. 3 is a high level flowchart of a computer implemented method of managing traffic of a mobile device exhibiting communication functionality associated with a user, according to some embodiments of the invention.

FIG. 3 is a high level flowchart of a computer implemented method of managing traffic of a mobile device exhibiting communication functionality associated with a user, according to some embodiments of the invention. The mobile device exhibits a plurality of wireless connectivity capabilities with a plurality of content providers via a plurality of communication links. The computer implemented method comprises the following stages: (i) tracking the users' external behavior, the users' content related behavior and communication behavior over time (stage 200); (ii) tracking data relating to users' geographical location over time (optionally, stage 210). (iii); tracking parameters of communication links over time and (optionally) at the different users' geographical locations (stage 220); (iv) scheduling communication related to predefined content (stage 230) responsive of users' external behavior, users' content related behavior and communication behavior at time slots selected such that the communication is performed in view of users' predefined or projected preferences in accordance with the parameters of communication links and (optionally) with data relating to users' geographical location over time; and (v) initiating communication related to predefined content (stage 240) according to the schedule of stage 230. Stages 200 and 210 may comprise simple logging of raw data and building a preference database. Stage 220 may comprise the extraction and storage of available communication connections in the users geographical route and area as simple logging of raw data and as building a communication availability database.

According to some embodiments of the invention, the computer implemented method further comprises determining the guidelines for preloading and caching by combining the information tracked in stages 200, 210, 220. Determining the guidelines may depend on the statuses of server 75 and mediator 73.

According to some embodiments of the invention, data relating to users' geographical location over time may comprise users' geographical location(s), a planned geographical location, a projected geographical location or combination thereof.

According to some embodiments of the invention, the computer implemented method further comprises creating conditional tasks lists including time event driven tasks, resource event driven tasks, user event driven tasks, server commanded tasks, as well as using the general parameters for decision making.

According to some embodiments of the invention, the computer implemented method further comprises queuing tasks in relation to any of the following: State of the cache, content updated from a direct connection to a PC, content updated from a server, content updated directly from a website, statuses of server 75 and mediator 73.

According to some embodiments of the invention, the computer implemented method further comprises enhancing the scheduling communication (stage 250) by utilizing data from at least one users' related information sources such as: users' navigation system, users related databases, databases of personal information management systems such as a digital calendar, server side information about events.

According to some embodiments of the invention, the computer implemented method further comprises defining and configuring priorities related to stages of the computer implemented method. Configuring priorities may be carried out manually or automatically.

According to some embodiments of the invention, any parameter related to the computer implemented method can independently be configured manually or automatically at any point. Also priorities for different parameters of the method may be independently, manually or automatically configured.

According to some embodiments of the invention, initiating communication (stage 240) is carried out between at least one of: at least one user and at least one server, at least two users.

According to some embodiments of the invention, the computer implemented method further comprises clustering the users into groups with similar characteristics (stage 260) relating to at least one of: the users' external behavior, the users' content related behavior, the users' communication behavior, the predefined content, external data related to the users.

According to some embodiments of the invention, the computer implemented method further comprises predicting user content consuming (stage 270) relating to at least one of: data from at least one of: users' navigation system, user's related databases, databases of personal information management systems such as a digital calendar.

According to some embodiments of the invention, the predefined content may comprise mail, web portals of any kind (like news, fashion), content portals like YouTube, music and radio, search engines, social networks, chats, peer to peer exchanged files, streaming audio, web portal, video, adobe flash, music, games, software, scripts, streaming of any kind, data updates. The predefined content may be either uploaded, downloaded, or exchanged among users or between users and servers.

Figure 4:
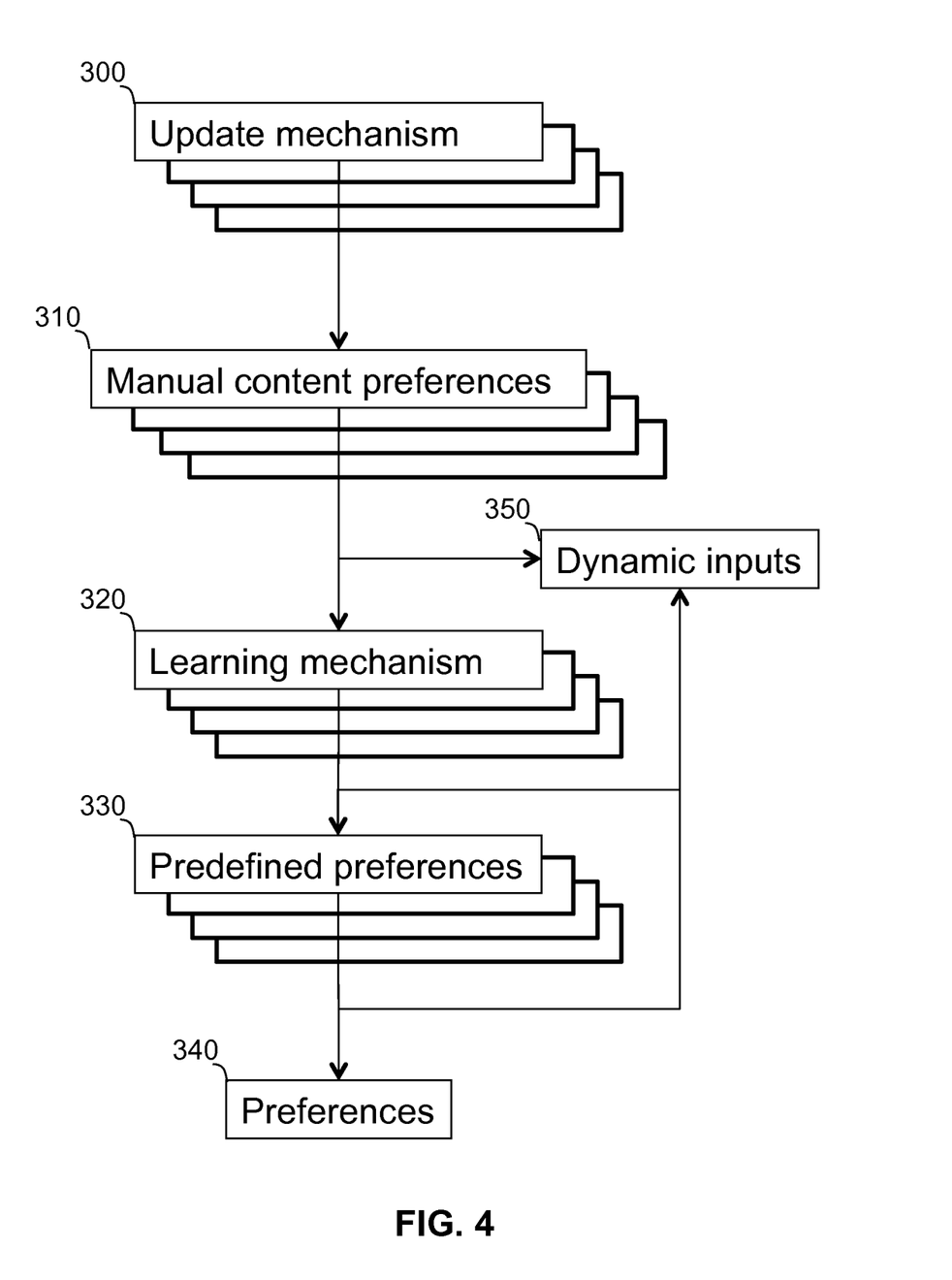
FIG. 4 is a high level flowchart illustrating the generation of preferences utilizing the traffic managing system and the computer implemented method, according to some embodiments of the invention.

FIG. 4 is a high level flowchart illustrating the generation of preferences 340 utilizing the traffic managing system and the computer implemented method, according to some embodiments of the invention. Content may enter the system via an update mechanism 300. The user may be prompted to set preferences related to the updated and prior available content by via update mechanism 300 which generates manual content preferences 310 setting. The user may input preferences into update mechanism 300 and the system and method may be arranged to incorporate user inputs into the automatic operation mode. The set preferences may then, during the operation of the system, be adapted in relation to dynamic inputs 350 and interactively with predefined preferences 330 by a learning mechanism 320. Update mechanisms 300, manual content preferences module 310, learning mechanisms 320 and predefined preferences may relate to different content sources, communication links, geographic locations, providers, etc. Preferences 340 generated via this recursive process may thus be adjusted to content supply and to user behavior (content related as well as external), characteristics and actions.

Figure 5:
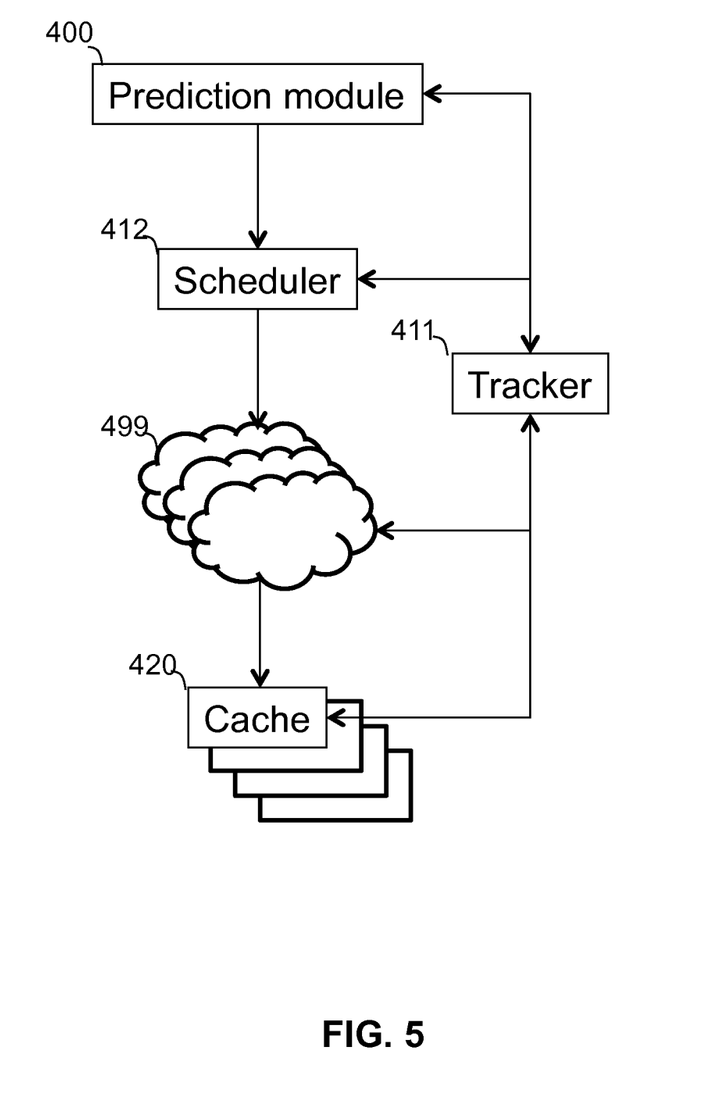
FIG. 5 is a high level block diagram of cache managing activities in the traffic managing module according to some embodiments of the invention.

FIG. 5 is a high level block diagram of cache managing activities in the traffic managing module according to some embodiments of the invention. Content caches 420 may comprise content from various suppliers and sources. Content may be provided to caches 420 responsive to a scheduler 412 via communication links 499 according to current activity and offerings and utilizing a prediction module 400 arranged to predict content, content-related behavior, and external behavior. A tracker 411 may be set to follow and interact with caches 420 either directly, over communication links 499 or via scheduler 412 or prediction module 400.

Figure 6:
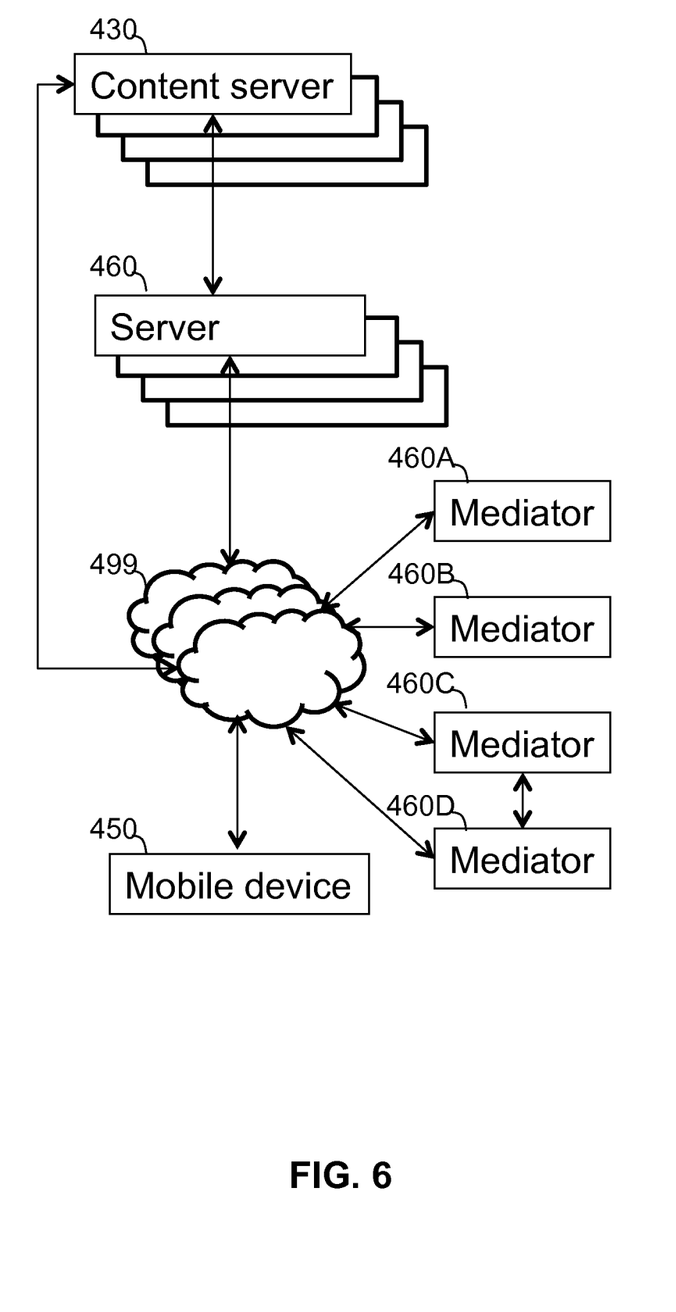
FIG. 6 is a high level block diagram illustrating possible connection configurations of mediators in the traffic managing module according to some embodiments of the invention.

FIG. 6 is a high level block diagram illustrating possible connection configurations of mediators in the traffic managing module according to some embodiments of the invention. Mediator 460A, 460B, 460C, 460D can be added to the basic system comprising a content server 430 connected to communication links 499 and to a server 460 which supplies content to a mobile device 450 of a user via communication links 499. Mediator 460A, 460B, 460C, 460D may be connected to the system via communication links 499. Mediators 460A, 460B, 460C, 460D can be arranged serially (e.g. 460C and 460D) or in parallel (e.g. 460A and 460B) and mediate content of content server 430 via communication links 499. Mediators 460A, 460B, 460C, 460D may be co-located with mobile device 450.

Figure 7:
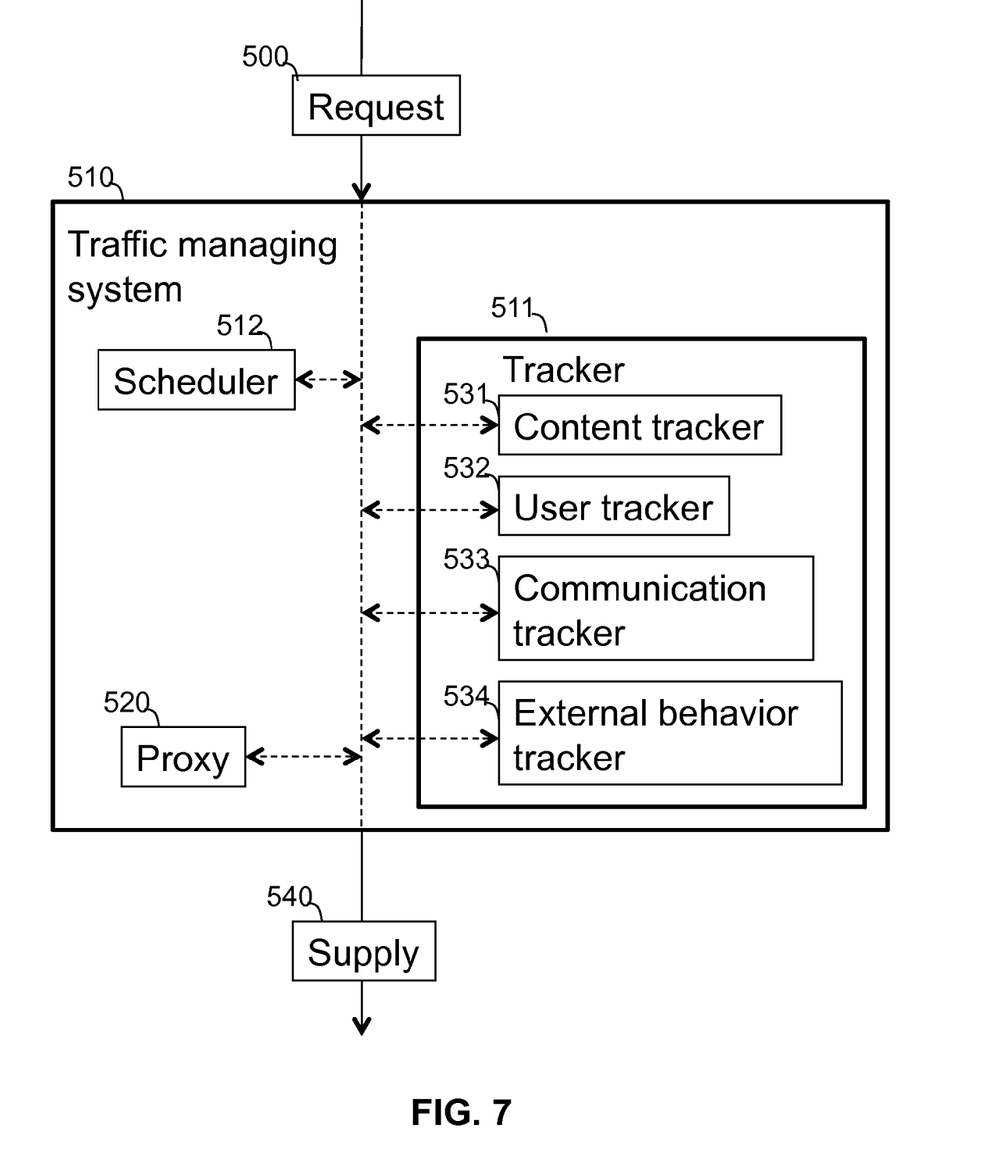
FIG. 7 is a high level block diagram illustrating various tracker components in the traffic managing module according to some embodiments of the invention.

FIG. 7 is a high level block diagram illustrating various tracker components in the traffic managing module according to some embodiments of the invention. In traffic managing system 510, comprising a scheduler 512, a tracker 511 and a proxy 520, and arranged to generate supplied content 540 from content requests 500, tracker 511 may comprise various elements. Tracker 511 may comprise a content tracker 531 tracking content, a user tracker 532 tracking user content related behavior, a communication tracker 533 tracking communication links and their characteristics, and an external behavior tracker 534 tracking the external behavior of the user. All tracker 511 elements may be harmonized and coordinated to allow an optimal content supply.

According to some embodiments of the invention, the computer implemented method may determine the mobile device's connection type at any specific location and time and cache the whole or part of the data to the mobile device's memory. Caching is carried out in a progressive manner whereby the downloaded data updates the existing data. The system optimizes the connection download (and the time slots) in terms of available bandwidth, availability of the connection type in the users' route, price of connection, battery life, available memory and update times of the users' preferred content. The computer implemented method may take into account the users' preferences for internet content, the users' internet usage patterns at specific times and locations, the common routes the users usually chooses and all the available different access parameters, methods and protocols available for the users' mobile device (such as: cellular 3G/4G HSPA, LTE, WiFi, Bluetooth, ultra wideband, USB, wireless USB, xDSL, IR (Infrared)) in that geographic area. The computer implemented method may further take into account the available bandwidth, availability of the connection types in the users' route, price of connection, update times of the users' preferred content, the predicted time of stay in the specific wireless providers' elements along the route.

According to some embodiments of the invention, the computer implemented method further comprises sharing information among the mobile devices, servers (e.g. content servers of traffic monitoring servers) or mediators. Shared information may comprise or be related to any of: the users' connectivity, the users' external behavior, the users' content related behavior, the users' communication behavior, the predefined content, external data related to the users.

According to some embodiments of the invention, the computer implemented method further comprises establishing a user to user connection as an ad hoc connection at any stage.

According to some embodiments of the invention, the computer implemented method further comprises storing user preferences in a secure entity and using an anonymous identification for users.

According to some embodiments of the invention, the computer implemented method further comprises utilizing the content related to users to gather information relating to at least one of: users' external behavior, users' content related behavior, characteristics relating to other users. The computer implemented method may further utilize voice recognition algorithms.

According to some embodiments of the invention, the system and method relate and utilize general parameters such as battery status, CPU (central processing unit) usage, available memory (e.g. RAM—random access memory), available file-system storage, connectivity of GPS (global positioning system) or of another method for determining location, location.

According to some embodiments of the invention, the system and method may exchange metadata between a server or a PC and the mobile device, for example preferences and/or raw data from the device to the server.

According to some embodiments of the invention, the system and method may calculate and distribute in advance the overall download data in respect of the expected connectivity, bandwidth and the time available for each connection and the expected route.

According to some embodiments of the invention, the system and method may delete obsolete files and manage communication according to the left/available memory. Cached data may be marked in some way, for example different background color.

According to some embodiments of the invention, the system and method may identify indicative preconditions and schedule communication accordingly. Such preconditions may comprise events related to users, spatio-temporal patterns of content request by users, recognized and expected routes of users. Such preconditions may either be inputted by users, received from a user related database or learned by the system and method from collected data relating to user behavior and consumption patterns. Preconditions may further be identified by clustering users into groups with similar characteristics.

According to some embodiments of the invention, the system and method may use more than one communication access simultaneously. The different access communication units/modules can be distributed and even work simultaneously in distributed mode. These distributed units can join data structures and functionalities in distributed or joint mode and exchange this information by any communication manner. The knowledge of the wireless possible connections in the mobile user device's area or route may be predefined by a database server or in the mobile users' memory. Alternatively, the knowledge of the wireless possible connections in the mobile user device's area or route may be dynamically obtained in real time by scanning for the wireless possible connections. Scanning for the wireless possible connections may be carried out by any mobile device exhibiting communication functionality, not necessary the one related to a specific communication.

According to some embodiments of the invention, the system and method may obtain information about traffic through the time of connection to the communication network.

According to some embodiments of the invention, the system and method may relate and be applicable to a non-mobile device, optimizing download rates and prices as they vary throughout the day. The system and method may relate and be applicable to managing power supply of the mobile device, relating to power supplies along the users' routes.

According to some embodiments of the invention, knowledge in advance of the users' route may be used for pre-distribution of the download data to the mobile device through different access points/base station of any protocol.

According to some embodiments of the invention, web links inside the emails may be preloaded off the relevant sites.

According to some embodiments of the invention, either user, provider or the system itself may determine communication priorities and security settings.

The present invention includes a system and method of dynamically using multiple access communication types for the purpose of caching or connecting to user preferred data. According to some embodiments of the invention, the system and method manage efficiently multi-access file exchange in time and space.

According to some embodiments of the invention, the system and method first learn, and then optimize the tempo-spatial patterns of file sharing by users of mobile devices.

According to some embodiments of the invention, the system and method help the users overcome the limitations of high cost connectivity whenever a low cost connectivity is not available. The system and method also help the users overcome high latency to wait for the data to download. These cost and latency have kept out many users from using cellular internet in mobile devices.

According to some embodiments of the invention, the invention boosts mobile internet browsing by downloading and caching of the predicted user data content in to the users' memory mobile device, by exploiting the multiple wireless communication access capabilities which exist in today's mobile devices by utilizing the users' habits, web content preferences, usual location routes and content consuming time, together with available bandwidth, availability of the connection type in the users' route, price of connection, battery life, available memory and update times of the users' preferred content, to provide users with an intermediate web browsing and content consuming experience.

According to some embodiments of the invention, the system includes the following: (i) a multi access connectivity caching resource decision based on the price of connection, location availability and available bandwidth vs. time; (ii) a prediction, caching and push algorithm with battery and memory considerations; and (iii) push algorithm clustering the users in to groups with similar characteristics.

According to some embodiments of the invention, the system uses information about the future in order to predict user content consuming, such as: Scheduled events (e.g. if users are clustered within an NBA New York Knicks basketball team the system will schedule and prioritize related content on match days) and user navigation system inputs (e.g. if user ask the navigation system to assist them to a certain location then the system knows the users' destination and route and thus schedules caching along the route with the available connectivity along the route, and the destination and route context with the most likely content to be consumed).

According to some embodiments of the invention, user behavior may be predicted utilizing any of: prior behavior of the user in a similar situation; behavior of other users in similar situation; content analyses of prior data; and prioritized list of complete possibilities, wherein "situation" may refer to location, route, time, correlated sequence of activities, etc.

According to some embodiments of the invention, the system and method comprise a privacy algorithm in which users' preferences are stored in a secure entity which contains the users' information. Users' preference information is stored in a different entity relating to which the algorithm uses an anonymous identification.

According to some embodiments of the invention, different access communication units or modules can be distributed and even work simultaneously in a patched-dispatched mode. These distributed units can join data structures and functionalities in distributed or joint mode and exchange this information by any communication manner. The distributed units may be physically separated and logically connected.

According to some embodiments of the invention, the caching algorithm predicts users' behavior given the fact that user consumed content through a desktop/laptop. For example, if a user browsed through a certain web site on his laptop he will not browse again through his mobile and vise versa (some things will be viewed again in the mobile), even if the system's decision engine predicts that users' has a high probability of browsing given a certain location and time. The same is true for the other way around, mobile browsing can eliminate the browsing on the desktop. In another example, the system and method may allow a user to repeat viewing a video and to send it to the users' contacts.

According to some embodiments of the invention, the system and method may implement upload virtual caching. For example, for uploading videos, the system and method may use the entire infrastructure (connectivity data) in the other direction (upload). In this case, the system and method may use the server as a medium layer and cache the file to the server and then upload to target server/URL.

According to some embodiments of the invention, the system and method may bill for the user interface or for pre cached content.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A traffic management system, comprising:
   a memory for storing a set of instructions; and
   one or more processors coupled to the memory, the one or more processors configured to execute the set of instructions to perform one or more operations, comprising:
      tracking information reflecting a user's geographical location, the user's communication behavior, one or more parameters of a set of communication links, and the user's content-related behavior associated with a mobile device, the content-related behavior including previously downloaded content to the mobile device,
      predicting content expected to be consumed on the mobile device based on the content-related user behavior, wherein the predicted content was not previously requested by the user, and predicting an expected route associated with the mobile device based on the tracked geographical location information,
      scheduling a future time slot to provide the predicted content to the mobile device based on the expected route, one of an expected battery life associated with the mobile device or digital calendar information associated with the user, and a set of communication parameters reflecting (i) an available bandwidth associated with a network determined to be currently available to the mobile device, (ii) an expected communication link predicted to be available to the mobile device at the future time slot along the expected route, and (iii) a connection type associated with the expected communication link, wherein the set of communication parameters is derived from the tracked geographical location, communication behavior, one or more parameters of the set of communication links, and content-related behavior information, and
      providing the predicted content to a cache of the mobile device in accordance with the scheduled time slot and an operational mode associated with the mobile device, wherein the providing synchronizes the cache automatically when the mobile device is associated with a standby mode, and wherein the providing synchronizes the cache in response to a request from the user when the mobile device is associated with a stealth mode.

2. The traffic managing system of claim 1, wherein the one or more operations include determining a predicted geographical location associated with the mobile device at the future time slot, and wherein the scheduling is further based on the predicted geographical location of the mobile device.

3. The traffic managing system of claim 1, wherein the one or more operations include tracking the geographical location information from a navigation system.

4. The traffic managing system of claim 1, wherein scheduling is further based on at least one grouping of users reflecting a cluster of users with similar characteristics.

5. The traffic managing system of claim 1, wherein the communication parameters further comprise a latency associated with the expected communication link.

6. The traffic managing system of claim 1, wherein communication parameters further comprise a connection type currently available to the mobile device.

7. The traffic managing system of claim 1, wherein providing the predicted content further comprises progressively updating existing data.

8. The traffic managing system of claim 1, wherein the scheduling is further based on a spatio-temporal pattern associated with the content-related user behavior.

9. The traffic management system of claim 1, wherein the communication parameters further comprise:
   a connection cost associated with the expected communication link;
   a bandwidth associated with the expected communication link; and
   an available bandwidth of the mobile device.

10. A computer implemented method of managing traffic, comprising the following operations performed on one or more processors:
    tracking information reflecting a user's geographical location, the user's communication behavior, one or more parameters of a set of communication links, and the user's content-related behavior associated with a mobile device, the content-related behavior including previously downloaded content to the mobile device;
    predicting content expected to be consumed on the mobile device based on the content-related user behavior, wherein the predicted content was not previously requested by the user;
    predicting an expected route associated with the mobile device based on the tracked geographical location information;
    scheduling a future time slot to provide the predicted content to the mobile device based on the expected route, one of an expected battery life associated with the mobile device or digital calendar information associated with the user, and a set of communication parameters reflecting (i) an available bandwidth associated with a network determined to be currently available to the mobile device, (ii) an expected communication link predicted to be available to the mobile device at the future time slot along the expected route, and (iii) a connection type associated with the expected communication link, wherein the set of communication parameters is derived from the tracked geographical location, communication behavior, one or more parameters of the set of communication links, and content-related behavior information; and providing the determined content to a cache of the mobile device in accordance with the scheduled time slot and an operational mode associated with the mobile device, wherein the providing synchronizes the cache automatically when the mobile device is associated with a standby mode, and wherein the providing synchronizes the cache in response to a request from the user when the mobile device is associated with a stealth mode.

11. The computer implemented method of claim 10, wherein the scheduling is further based on at least three of a battery status, CPU usage, an available memory, an available file-system storage, a connectivity of GPS, a connectivity of a system for determining location, or a location of the mobile device.

12. The computer implemented method of claim 10, further comprising tracking over time the geographical location information from a navigation system.

13. The computer implemented method of claim 10, further comprising grouping users with logical proximity, and enabling exchanging data between users with logical proximity, and wherein the future time slot is further based a grouping associated with the user.

14. The computer implemented method of claim 10, further comprising storing user preferences in a secure entity and using an anonymous identification for the user.

15. The computer implemented method of claim 10, further comprising defining and configuring priorities related to stages of the computer implemented method, wherein configuring priorities may be carried out manually or automatically.

16. The computer implemented method of claim 10, wherein scheduling is further based on predefined user preferences.

17. The computer implemented method of claim 10, wherein the communication parameters further comprise a latency associated with the expected communication link.

18. The computer implemented method of claim 10, wherein the communication parameters further comprise a connection type currently available to the mobile device.

19. The computer implemented method of claim 10, wherein providing the predicted content further comprises progressively updating existing data.

20. The computer implemented method of claim 10, wherein the scheduling is further based on a spatio-temporal pattern associated with the content-related user behavior.

21. The computer implemented method of claim 10, wherein the communication parameters further comprise:
a connection cost associated with the expected communication link;
a bandwidth associated with the expected communication link; and
an available bandwidth of the mobile device.

22. A traffic management method comprising the following operations performed on one or more processors:
predicting data a user is likely to consume on a mobile device, wherein the predicted data was not previously requested by the user, the predicting comprising recognizing a data access pattern associated with the user over a time period, wherein the data access pattern includes a data type and an event correlated to the access of the data;
predicting an expected route associated with the mobile device based on tracked geographical location information associated with a user;
scheduling a future time slot to retrieve the predicted data based on the expected route, one of an expected battery life associated with the mobile device or digital calendar information associated with the user, and a set of connection conditions reflecting (i) a network determined to be available to the mobile device, (ii) an available bandwidth associated with the determined network and the mobile device, and (iii) a connection type of an expected communication link predicted to be available to the mobile device at the future time slot along the expected route, wherein the set of connection conditions is derived from tracked information associated with the user's geographical location, content related behavior, communication behavior, and one or more parameters of a set of communication links associated with the mobile device, and wherein the set of communication links includes the determined network and the expected communication link;
retrieving the predicted data, over a network, from a data source in accordance with the scheduled time slot; and
providing the retrieved data to a mobile device cache accessible to an application program running on the mobile device, wherein the providing synchronizes the mobile device cache automatically when the mobile device is associated with a standby mode, and wherein the providing synchronizes the cache in response to a request from the user when the mobile device is associated with a stealth mode.

23. The method of claim 22, wherein the connection conditions include a latency associated with the network available to the mobile device and a connection type associated with the network determined to be available to the mobile device.

24. The method of claim 22, wherein providing the retrieved data includes providing the retrieved data progressively by updating existing data.

25. The method of claim 22, wherein the data is retrieved based on a determination that the data is not stored in the mobile device cache.

26. A traffic management system comprising:
a memory storing a set of instructions;
one or more processors coupled to the memory, the one or more processors configured to execute the set of instructions to perform one or more operations, comprising:
predicting data a user is likely to consume on a mobile device, wherein the predicted data was not previously requested by the user, the predicting comprising recognizing a data access pattern associated with the user over a time period, wherein the data access pattern includes a data type and an event correlated to the access of the data;
predicting an expected route associated with the mobile device based on tracked geographical location information associated with a user;

scheduling a future time slot to retrieve the predicted data based on the expected route, one of an expected battery life associated with the mobile device or digital calendar information associated with the user, and a set of connection conditions reflecting (i) a network determined to be available to the mobile device, (ii) an available bandwidth associated with the determined network and the mobile device, and (iii) a connection type of an expected communication link predicted to be available to the mobile device at the future time slot, wherein the set of connection conditions is derived from tracked information associated with the user's geographical location, content related behavior, communication behavior, and one or more parameters of a set of communication links associated with the mobile device, the set of communication links including the determined network and the expected communication link;

retrieving the predicted data, over a network, from a data source, in accordance with the scheduled time slot, and providing the retrieved data to a mobile device cache accessible to an application program running on the mobile device, wherein the providing synchronizes the mobile device cache automatically when the mobile device is associated with a standby mode, and wherein the providing synchronizes the cache in response to a request from the user when the mobile device is associated with a stealth mode.

27. The traffic management system of claim 26, wherein the connection conditions include a latency and a connection type associated with the network available to the mobile device.

28. The traffic management system of claim 26, wherein providing the retrieved data includes providing the retrieved data progressively by updating existing data.

29. The traffic management system of claim 26, wherein the data usage pattern is a spatio-temporal pattern.

30. The traffic management system of claim 26, wherein the data is retrieved based on a determination that the data is not stored in the mobile device cache.

* * * * *